(12) United States Patent
Anway (10) Patent No.: US 11,260,987 B2
(45) Date of Patent: Mar. 1, 2022

(54) LIGHTNING CONDITIONING OF AIRCRAFT

(71) Applicant: The Boeing Company, Chicago, IL (US)

(72) Inventor: Carol E. Anway, North Bend, WA (US)

(73) Assignee: The Boeing Company, Chicago, IL (US)

( * ) Notice: Subject to any disclaimer, the term of this patent is extended or adjusted under 35 U.S.C. 154(b) by 132 days.

(21) Appl. No.: 16/885,626

(22) Filed: May 28, 2020

(65) Prior Publication Data

US 2021/0371124 A1 Dec. 2, 2021

(51) Int. Cl.
| | |
|---|---|
| *B64D 45/02* | (2006.01) |
| *B64C 1/12* | (2006.01) |
| *B64C 1/36* | (2006.01) |
| *H02G 13/00* | (2006.01) |
| *F03D 80/30* | (2016.01) |
| *F03D 3/06* | (2006.01) |
| *F16B 5/02* | (2006.01) |

(52) U.S. Cl.
CPC ........... *B64D 45/02* (2013.01); *B64C 1/12* (2013.01); *B64C 1/36* (2013.01); *F03D 3/06* (2013.01); *F03D 80/30* (2016.05); *F16B 5/02* (2013.01); *H02G 13/80* (2013.01)

(58) Field of Classification Search
CPC .. B64D 45/02; B64C 1/36; B64C 1/12; H02G 13/80; H02G 13/00; F03D 80/30; F03D 1/06; F03D 3/06; F03D 3/062; B29C 73/00; F16B 5/02; F16B 33/00; F16B 33/004

USPC ......................................... 361/212, 218, 220
See application file for complete search history.

(56) References Cited

U.S. PATENT DOCUMENTS

| | | |
|---|---|---|
| 4,897,143 A | 1/1990 | Covey |
| 9,514,917 B1 | 12/2016 | McIver et al. |
| 2008/0137259 A1* | 6/2008 | Heeter .................. B64D 37/32 361/218 |

(Continued)

OTHER PUBLICATIONS

Yu, Hong; Heider, Dirk; Advani, Suresh; A 3D microstructure based resistor network model for the electrical resistivity of unidirectional carbon composites, Composite Structures, Elsevier, Sep. 5, 2015, pp. 740-749.

(Continued)

*Primary Examiner* — Danny Nguyen
(74) *Attorney, Agent, or Firm* — Quinn IP Law (57) ABSTRACT

A method for conditioning to reduce lightning strike effects is provided herein. The method includes positioning a plurality of tabs on a component. The plurality of tabs are electrically conductive. The component includes at least one of a composite material and a metal material having at least one joint. The method includes positioning the component on a support that is electrically insulated, and connecting a plurality of wires between an initial set of the plurality of tabs and a pulse generator. The pulse generator is configured to generate a plurality of current pulses through the plurality of wires. The plurality of current pulses imitate a plurality of lightning strikes. The method further includes striking the component with the plurality of current pulses from the pulse generator, and reconnecting the plurality of wires to one or more different sets of the plurality of tabs between the plurality of current pulses.

20 Claims, 9 Drawing Sheets

(56) References Cited

U.S. PATENT DOCUMENTS

2017/0328350 A1* 11/2017 Bendlak ................ F03D 80/30

OTHER PUBLICATIONS

Yu, Hong; Heider, Dirk; Advani, Suresh; Role of in-stacking sequence on transverse effective thermal conductivity of unidirectional composite laminates, International Journal of Heat and Mass Transfer, Elsevier, Mar. 5, 2015, pp. 897-903.
Military Standard Lightning Qualification Test Techniques for Aerospace Vehicles and Hardware, MIL-STD-1757A, Jul. 20, 1983.

* cited by examiner

_Fig-3_

_Fig-4_

LIGHTNING CONDITIONING OF AIRCRAFT

TECHNICAL FIELD

The disclosure relates generally to aircraft manufacturing, and in particular, to lightning conditioning of the aircraft.

BACKGROUND

Active aircraft are struck by lightning once or twice a year. Therefore, the aircraft are designed so that the lightning strikes are an ordinary situation with no impact to the aircraft or travelers. Natural lightning has a distribution of possible current levels. Most natural lighting strikes have current levels between 10,000 amperes and 30,000 amperes. Designs of the aircraft protect the aircraft fuel tanks from sparking, protect onboard computers from electronic upset, and direct the lightning currents away from sensitive places. In particular, the fuel tanks are coated with a lightly conducting sealant, shielding is used to protect the wiring, and transient voltage suppression diodes are installed to intercept any electronic upsets. Lightning protection systems are sized to meet Federal Aviation Administration criteria for a worst-case current of 200,000 amperes in a first lighting strike that the aircraft experiences. A weight of the lighting protection systems in a commercial aircraft may be hundreds of pounds.

SUMMARY

A method for conditioning to reduce lightning strike effects is disclosed herein. The method includes positioning a plurality of tabs on a component. The plurality of tabs are electrically conductive. The component includes at least one of a composite material and a metal material. The metal material includes at least one joint. The method includes positioning the component on a support that is electrically insulated, and connecting a plurality of wires between an initial set of the plurality of tabs and a pulse generator. The pulse generator is configured to generate a plurality of current pulses through the plurality of wires. The plurality of current pulses imitate a plurality of lightning strikes. The method further includes striking the component with the plurality of current pulses from the pulse generator, and reconnecting the plurality of wires to one or more different sets of the plurality of tabs between the plurality of current pulses.

In one or more embodiments of the method, the component is an aircraft.

In one or more embodiments of the method, the component is part of an aircraft.

In one or more embodiments, the method includes enclosing the component inside a chamber during the striking. The chamber is configured to contain leakage currents from the plurality of current pulses.

In one or more embodiments of the method, the composite material has a plurality of ply layers. At least two of the plurality of tabs are positioned on the component perpendicular to the plurality of ply layers and on opposite sides of the plurality of ply layers.

In one or more embodiments of the method, the component includes the at least one joint, and the plurality of current pulses exceed a minimum current that causes sparking at the at least one joint.

In one or more embodiments of the method, at least one of the plurality of current pulses is in a range of approximately 180,000 amperes to approximately 220,000 amperes.

In one or more embodiments of the method, each of the plurality of current pulses has a double-exponential waveform.

In one or more embodiments of the method, each of the plurality of current pulses has a component-A waveform in accordance with MIL-STD-1757A or a square wave waveform.

In one or more embodiments, the method further includes charging a first capacitor bank while a second capacitor bank provides electrical power to the pulse generator, and switching the second capacitor bank with the first capacitor bank in response to the second capacitor bank becoming discharged.

A conditioning system is provided herein. The conditioning system includes a support, a pulse generator, a plurality of tabs, and a plurality of wires. The support is electrically insulated and configured to hold a component. The component includes at least one of a composite material and a metal material. The metal material includes at least one joint. The pulse generator is configured to generate a plurality of current pulses. The plurality of current pulses imitate a plurality of lightning strikes. The plurality of tabs are electrically conductive and positioned on the component. The plurality of wires are connected to the pulse generator and removably connectable to an initial set of the plurality of tabs. The conditioning system is configured to strike the component with the plurality of current pulses from the pulse generator. The plurality of wires are moveable to one or more different sets of the plurality of tabs between the plurality of current pulses.

In one or more embodiments of the conditioning system, the component is an aircraft.

In one or more embodiments of the conditioning system, the component is a part of an aircraft.

In one or more embodiments, the conditioning system further includes a chamber configured to enclose the component during the strikes. The chamber is configured to contain leakage currents from the plurality of current pulses.

In one or more embodiments of the conditioning system, the composite material has a plurality of ply layers. At least two of the plurality of tabs are positioned on the component perpendicular to the plurality of ply layers and on opposite sides of the plurality of ply layers.

In one or more embodiments of the conditioning system, the component includes the at least one joint. The plurality of current pulses exceed a minimum current that causes sparking at the at least one joint.

In one or more embodiments of the conditioning system, at least one of the plurality of current pulses is in a range of approximately 180,000 amperes to approximately 220,000 amperes.

In one or more embodiments of the conditioning system, each of the plurality of current pulses has a double-exponential waveform.

In one or more embodiments of the conditioning system, each of the plurality of current pulses has a component-A waveform in accordance with MIL-STD-1757A or a square wave waveform.

A component of an aircraft condition by a method is disclosed herein. The method includes positioning a plurality of tabs on a component. The plurality of tabs are electrically conductive. The component includes at least one of a composite material and a metal material. The metal material includes at least one joint. The method includes positioning the component on a support that is electrically insulated, and connecting a plurality of wires between an initial set of the plurality of tabs and a pulse generator. The pulse generator is configured to generate a plurality of current pulses through the plurality of wires. The plurality of current pulses imitate a plurality of lightning strikes. The method further includes striking the component with the plurality of current pulses from the pulse generator, and reconnecting the plurality of wires to one or more different sets of the plurality of tabs between the plurality of current pulses.

The above features and advantages, and other features and advantages of the present disclosure are readily apparent from the following detailed description of the best modes for carrying out the disclosure when taken in connection with the accompanying drawings.

DETAILED DESCRIPTION

This disclosure is susceptible of embodiments in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Background, Summary, and Detailed Description sections, but not explicitly set forth in the claims, should not be incorporated into the claims, singly or collectively, by implication, inference or otherwise.

For purposes of the present detailed description, unless specifically disclaimed, the singular includes the plural and vice versa. The words "and" and "or" shall be both conjunctive and disjunctive. The words "any" and "all" shall both mean "any and all", and the words "including," "containing," "comprising," "having," and the like shall each mean "including without limitation." Moreover, words of approximation such as "about," "almost," "substantially," "approximately," and "generally," may be used herein in the sense of "at, near, or nearly at," or "within 0-5% of," or "within acceptable manufacturing tolerances," or other logical combinations thereof. Referring to the drawings, wherein like reference numbers refer to like components.

Embodiments of the present disclosure may include a method and/or conditioning system that subject aircraft components and/or aircraft to imitation lighting strikes in a controlled environment. The imitation lighting strikes may be performed while the components/aircraft are on the ground and before lightning-sensitive electronics are installed. During the imitation lightning strikes, the aircraft/components sinter together at connecting joints. Therefore, the aircraft/components have less resistance at the joints during subsequent natural lighting strikes. During the imitation lightning strikes, the aircraft/components carbon fiber reinforced skin and structure material are similarly and permanently conditioned to have less resistance during subsequent natural lightning strikes. Furthermore, less energy from the subsequent natural lighting strikes is deposited in the joints due to the lower resistance. The aircraft/components are therefore better prepared to tolerate the natural lightning strikes after the conditioning treatment.

The conditioning method and/or system generally reduce costs and weights of lightning protection features of the aircraft. Test data shows that resistances of the aircraft, the aircraft components made of composite materials, metal materials, metal-and-composite materials, and contact resistances of fasteners in respective holes, decrease with each lightning strike. Therefore, as a part of launching each new aircraft, the aircraft components and/or the aircraft may be subjected to the imitation lightning strikes before the aircraft leave the ground. The imitation lightning strikes condition the structure of the new aircraft to settle down into a better situation. In particular, the imitation lighting strikes reduce electrical resistance of the aircraft materials and joints, and reduce problems of damage due to the natural lightning strikes. Since the criteria for a second natural lighting strike and subsequent natural lighting strikes on the aircraft is lower than a first natural lighting strike, the costs and weight may be saved on the lightning protection features built into the aircraft.

The conditioning may be performed during the manufacturing process to minimize the effects of the natural lightning strikes before first flights. The conditioning includes placing a structure (e.g., the component or the aircraft) in a chamber, charging a capacitor bank, connecting electrical leads to tabs on the structure, and discharging the capacitor bank to send one or more current pulses through the structure. In some situations, the tabs may be built into the components to support the current injection. In other situations, the tabs may be added to the components to allow for the conditioning. The electrical leads may include connectors and wires that carry the imitation lightning strikes. In various embodiments, the connectors may be pressed against, bolted to, clamped to, or physically and electrically connected to the tabs prior to the conditioning. The connectors may subsequently be removed from the tabs after the conditioning.

The current pulse may be shaped to imitate a natural lightning strike. Subsequent current pulses may be applied to further the conditioning of the structure. The current pulses may be applied at different locations to control where the component/aircraft is conditioned. The current pulses generally cause the aircraft materials and joints to sinter together to become less resistive so that subsequent natural lighting strikes are less damaging. Conditioning the parts allows for building the aircraft and/or the components to a lower specification of a second natural lighting strike, rather than a first natural lighting strike, because the conductivity of the components increases by up to a factor of ten due to the conditioning treatment.

Figure 1:
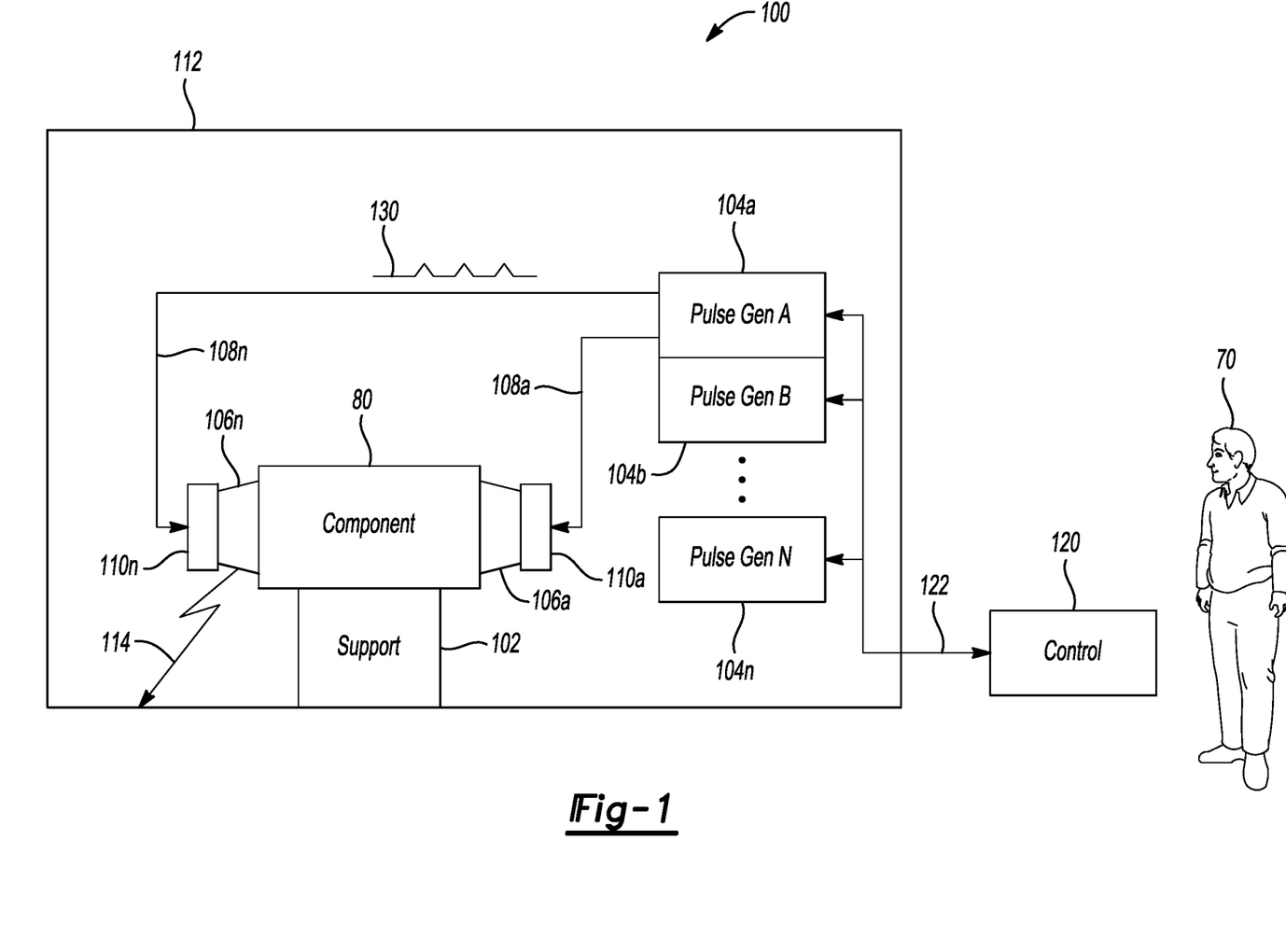
FIG. 1 is a schematic diagram of a conditioning system in accordance with an exemplary embodiment.

Referring to FIG. 1, a schematic diagram of an example implementation of a conditioning system 100 is shown in accordance with an exemplary embodiment. The conditioning system 100 generally includes a support 102, one or more pulse generators 104a-104n, multiple tabs 106a-106n, multiple wires 108a-108n, multiple connectors 110a-110n, a chamber 112, a control circuit 120, and a communication bus 122. The conditioning system 100 may be operational to condition a component 80 to reduce lightning strike effects on that component 80.

The component 80 may implement a conductive part of an aircraft or the aircraft. For a component 80 that is part of an aircraft, the conditioning may be performed prior to installation of the component 80 on the aircraft. The component 80 includes at least one of a composite material and a metal material. In embodiments implemented solely with metal materials, the component 80 includes multiple adjoining metal panels that form at least one joint. In embodiments implemented solely with composite materials, the component 80 may include one or more panels made of one or more composite materials. Each pair of adjoining composite panels form at least one joint. In embodiments implemented with both metal materials and composite materials, each pair of adjoining panels forms at least one joint. The panels are generally connected to each other by one or more fasteners at each joint.

Each composite panel has multiple ply layers joined together at inter-layer seams. In various embodiments, the component 80 is one or more carbon fiber reinforced plastic panels. In other embodiments, the component 80 is one or more carbon fiber reinforced plastic panels fastened to metal or other carbon fiber reinforced plastic panels with metal fasteners. In still other embodiments, the component 80 is one or more carbon fiber reinforced plastic panels bonded to metal or other carbon fiber reinforced plastic panels using adhesive bonding, co-bonding, or co-curing.

The support 102 is implemented as a pedestal and/or a platform. The support 102 is generally operational to hold the component/aircraft 80 while the current pulses are being applied. The support 102 is electrically insulated to help avoid unwanted leakage currents 114 from flowing around the component/aircraft 80 during the conditioning. In various embodiments, the support 102 includes one or more of the wires 108a-108n, one or more of the connectors 110a-110n, and/or one or more grounding paths built therein. In some situations, the support 102 is tailored to the specific parts to be conditioned with the current pulses 130. In other situations, the support 102 is reconfigurable to handle parts of different shapes and/or sizes.

The pulse generators 104a-104n are implemented as current pulse generators. Each pulse generator 104a-104n is operational to generate an imitation lighting strike at a current up to a worse-case natural lighting strike (e.g., approximately 200,000 amperes). The pulse generators 104a-104n cause the lightning conditioning of the component 80 to make the component less susceptible to the natural lightning strikes.

Each pulse generator 104a-104n may include multiple (e.g., two) capacitor banks to create a sequence of current pulses 130. In some embodiments, a first capacitor bank may be used to create one or more first current pulse(s) (e.g., a range of approximately 180,000 amperes to approximately 220,000 amperes) while a second capacitor bank is being charged. After the first current pulse(s), the capacitor banks may be switched (or swapped) such that the second capacitor bank is used to create one or more second current pulse(s). Once the first capacitor bank has been recharged, the capacitor banks may be switched again with the first capacitor bank being used to generate one or more third current pulse(s), and so on.

The tabs 106a-106n are implemented as metal tabs. Each tab 106a-106n is electrically conductive, and either connectable to or formed as part of the component 80. The tabs 106a-106n are operational to direct the current pulses 130 through the component 80 while avoiding surface damage due to electrical arcs. In various embodiments, the tabs 106a-106n may be removed from the component 80 at the end of the conditioning treatment. In other embodiments, the tabs 106a-106n may be consumed by the current pulses 130 during the conditioning treatment. In still other embodiments, the tabs 106a-106n may remain as parts of the component 80 at the end of the conditioning treatment.

The tabs 106a-106n may be grouped into sets. By way of example, a first set of the tabs 106a-106n (e.g., tabs 106a and 106b) may be positioned vertically (e.g., a z direction) across the component 80. A second set of the tabs 106a-106n (e.g., tabs 106c and 106d) may be positioned horizontally (e.g., an x direction) across the component 80. A third set of the tabs 106a-106n (e.g., tabs 106e and 106f) may also be positioned horizontally (e.g., a y direction) across the component 80. The current pulses 130 may be applied to the different sets of the tabs 106a-106n in a sequence, one set at a time, to condition the component 80 along multiple directions.

In various embodiments, the tabs 106a-106n are removably connectable to the component 80. For example, the tabs 106a-106n are connected to the component 80 by fasteners screwed into holes drilled into the component 80. In another example, a conformal conductive material, such as braided wire or metal foil, is adhered to the component 80 and the tabs 106a-106n are attached to the conformal conductive material. In yet another example, an edge of the component 80 is sanded to expose the fibers. A silver paste is subsequently used to secure the tabs 106a-106n to the exposed fibers. In other embodiments, the tabs 106a-106n are integral parts of the component 80.

The wires 108a-108n implement braided wires. The wires 108a-108n are generally operational to carry the current pulses 130 from the pulse generators 104a-104n to the tabs 106a-106n. Each wire 108a-108n is connected to one of the pulse generators 104a-104n (e.g., the pulse generator 104a as illustrated). Each wire 108a-108n is removably connectable to a corresponding tab 106a-106n. The wires 108a-108n enable the current pulses 130 to be directed to the component 80 along fixed paths that direct the power to the tabs 106a-106n, instead of the surface of the component 80 which could otherwise be damaged.

In various embodiments, a wire (e.g., 108a) may be initially connected to an initial tab (e.g., 106a) in an initial set of the tabs 106a-106n to convey the first current pulse(s). The wire 108a may be moved from the initial tab 106a to another tab (e.g., 106c) in a second set of the tabs 106a-106n to convey the second current pulse(s). The wire 108a may be moved from the second tab 106c to another tab (e.g., 106e) in a third set of the tabs 106a-106n to convey the third current pulse(s). In other embodiments, the wires 108a-108n may remain attached to corresponding tabs 106a-106n during the sequence of current pulses 130, with the pulse generators 104a-104n switching the current pulses 130 onto different sets of the wires 108a-108n. For example, the pulse generator 104a may direct the first current pulse(s) to the wires 108a and 108b, the second current pulse(s) to the wires 108c and 108d, and the third current pulse(s) to the wires 108e and 108f. In various embodiments, different sets of the wires 108a-108n may be connected to different pulse generators 104a-104n. For example, a first set of wires 108a and 108b may be connected to the pulse generator 104a to provide the first current pulse(s) to the component 80. A second set of wires 108c and 108d may be connected to the pulse generator 104b to provide the second current pulse(s) to the component 80. A third set of wires 108e and 108f may be connected to the pulse generator 104n to provide the third current pulse(s) to the component 80. In yet other embodiments, the tabs 106a-106n may be removed, relocated to different locations, and reattached to the component 80 between the current pulses. Other mechanisms for directing the current pulses 130 to different parts of the component 80 may be implemented to meet the design criteria of a particular conditioning application.

The connectors 110a-110n implement contacts permanently attached to the corresponding wires 108a-108n. The connectors 110a-110n are generally operational to transfer the current pulses 130 between the wires 108a-108n and the tabs 106a-106n. Each connector 110a-110n is removably connectable to an individual tab 106a-106n and moveable among the tabs 106a-106n. The connectors 110a-110n provide reliable and replaceable connections between the tabs 106a-106n and the wires 108a-108n.

The connectors 110a-110n are generally pressed against the tabs 106a-106n. In some embodiments, the connectors 110a-110n may be attached to the tabs 106a-106n by nuts and bolts. In other embodiments, the connectors 110a-110n may be implemented as spring-loaded clamps that clip to the tabs 106a-106n. Such connectors 110a-110n may include teeth to provide reliable mechanical and electrical connections to the tabs 106a-106n. To avoid sparks, a pressure of contact between the connectors 110a-110n and the tabs 106a-106n may be increased using pneumatic systems and/or quick release latches.

The chamber 112 implements an electrically isolated chamber sized to enclose the component 80 during the strikes by the current pulses 130. The chamber 112 is generally operational to maintain the current pulses 130 in a confined space away from a user 70. The chamber 112 may include an electrically conductive surface to carry the leakage currents 114, if any, from the current pulses 130 to an earth ground. In some embodiments, the chamber 112 may be sized to house a completed aircraft.

The chamber 112 includes one or more lock-out features that prevent the pulse generators 104a-104n from generating the current pulses 130 and associated high voltages (e.g., greater than 1,000 volts) while the interior of the chamber 112 is accessible to the user 70. Protection mechanisms may be implemented, such as laser beams, warning lights over the doors and audio alarms. Furthermore, an automated locking mechanism may be operated with the same motion that engages the connectors 110a-110n with the component 80.

The leakage current 114 includes currents flowing to contacting parts and/or sparking to nearby electrically conductive parts. The leakage current 114 can also create electromagnetic emissions that induce currents in nearby conducting things, and emissions from the sparks or currents that may upset nearby electronics, and/or interfere with radio transmission.

The control circuit 120 may be implemented as one or more computers. The control circuit 120 is generally operational to control generation of the current pulses 130 during the conditioning treatments. The control may include, but is not limited to, a number of current pulses 130, an amplitude of the current pulses 130, a waveform of the current pulses 130, and timing of the current pulses 130. The control circuit 120 generally enables the user 70 to observe a progress of the conditioning treatment and adjust the conditioning where appropriate.

The communication bus 122 implements a bidirectional, multi-node digital bus. The communication bus 122 is generally operational to carry commands and data from the control circuit 120 to the pulse generators 104a-104n. The communication bus 122 may also carry data, measured values, and diagnostics information from the pulse generators 104a-104n to the control circuit 120. In various embodiments, the communication bus 122 may be implemented as a fiber-optical bus (e.g., a Gigabit Ethernet bus). In other embodiments, the communication bus 122 may by implemented as a wireless bus (e.g., Wi-Fi). Other embodiments of the communication bus 122 may be implemented to meet the design criteria of a particular application.

Figure 2:
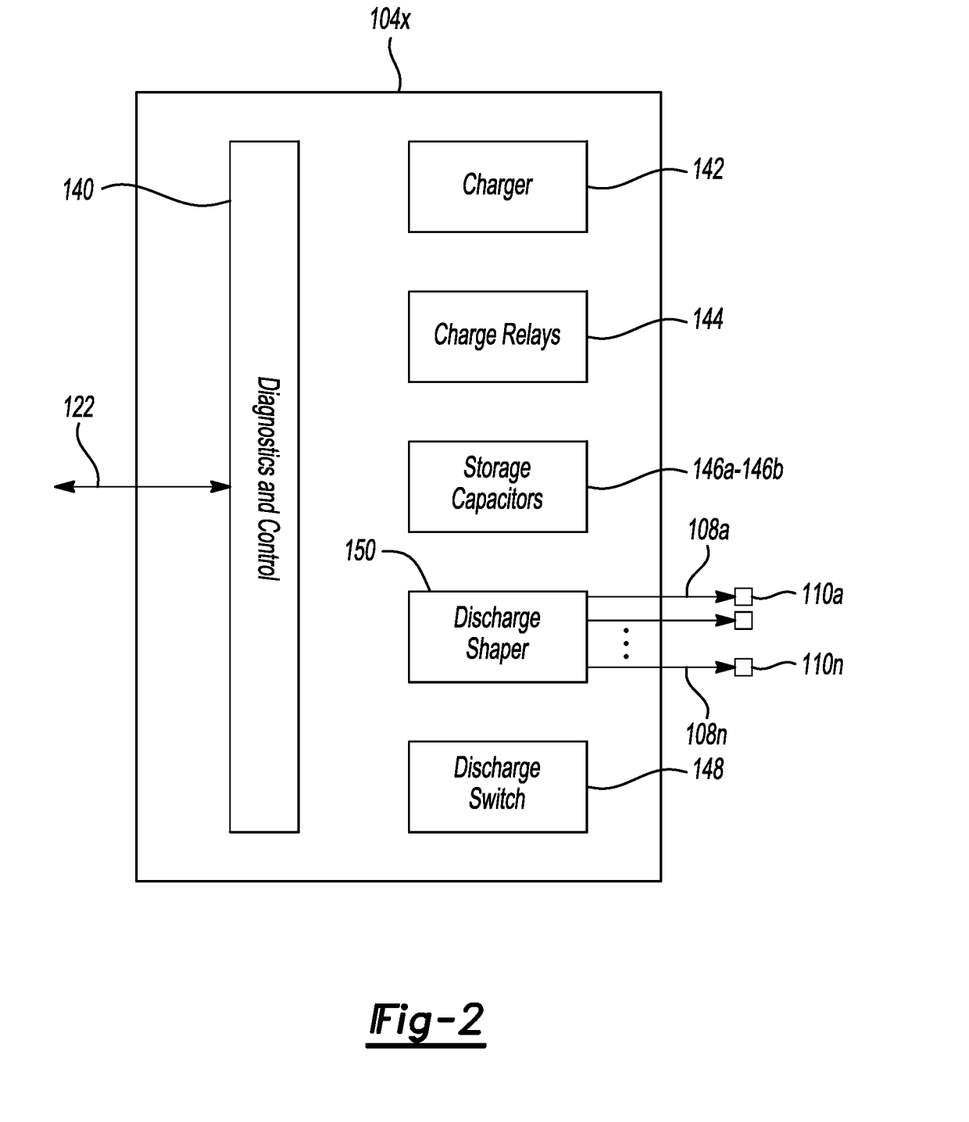
FIG. 2 is a schematic block diagram of a pulse generator of the conditioning system in accordance with an exemplary embodiment.

Referring to FIG. 2, a schematic block diagram of an example implementation of a pulse generator 104x is shown in accordance with an exemplary embodiment. The pulse generator 104x may be representative of the pulse generators 104a-104n. The pulse generator 104x generally includes a diagnostic and control circuit 140, a charger 142, charge relays 144, capacitor banks 146a-146b, one or more discharge switches 148 (one shown), and a discharge shaper 150. The discharge shaper 150 may be electrically connected to the wires 108a-108n. The diagnostic and control circuit 140 may be connected to the communication bus 122.

The diagnostic and control circuit 140 implements an electrical circuit. The diagnostic and control circuit 140 is generally operational to control the generation of the current pulses 130 in the wires 108a-108n. The diagnostic and control circuit 140 may also be operational to perform diagnostics on the pulse generator 104x. Commands and information generated by the control circuit 120 may be received by the diagnostic and control circuit 140 via the communication bus 122. Self-test information and measurement information generated by the pulse generator 104x may be reported to the control circuit 120 via the communication bus 122.

The charger 142 implements a controlled voltage source. The charger 142 is generally operational to produce a high voltage used to trickle change the capacitor banks 146a-146b. The high voltage is generally less than an atmospheric breakdown voltage (e.g., approximately 20,000 volts). In situations where the atmosphere inside the chamber 112 is controlled to a higher breakdown voltage (e.g., 75,000 volts), the charger 142 may generate a correspondingly higher charging voltage.

The charge relays 144 implement high-voltage relays (or switches). The charge relays 144 are closed to permit the charger 142 to present the high voltage to a bank of the capacitor banks 146a-146b that is being charged. The charge relays 144 are opened once the capacitor bank 146a or 146b has been charged.

The capacitor banks 146a-146b implement one or more capacitor banks. The capacitor banks 146a-146b are generally operational to produce the current pulses 130 when discharged into the discharge shaper 150. One or more of the current pulses 130 may be in a range of approximately 180,000 amperes to approximately 220,000 amperes. One or more of the current pulses 130 may convey less than 180,000 amperes. For example, some of the current pulses 130 may be in a lower range of approximately 120,000 amperes to approximately 180,000 amperes. Some current pulses 130 may be in a range of approximately 60,000 amperes to approximately 120,000 amperes.

In various embodiments, the capacitor banks 146a-146b are charged slowly (e.g., trickle charged), compared with the discharge, to prevent overwhelming an electrical grid that powers the conditioning system 100. For ease of manufacturing, multiple (e.g., two) capacitor banks 146a and 146b are implemented, with one bank charging while the other bank is discharging. In some embodiments, the capacitor banks 146a-146b may draw more power from the electrical grid in order to recharge in less time compared with the trickle charging.

The discharge switch 148 implements a high-voltage switch (or relay). The discharge switch 148 is open while the corresponding bank of the capacitor banks 146a-146b is charging. The discharge switch 148 is closed to discharge the corresponding bank into the discharge shaper 150. In various embodiments, the discharge switch 148 may be controlled by an insulated (e.g., plastic) tube pneumatic system that passes through a wall of the chamber 112 so as to avoid any potential direct electrical path from the capacitor banks 146a-146b to the user 70.

The discharge shaper 150 implements a pulse shaping network. The discharge shaper 150 is generally operational to control a waveform of the current pulse 130 produced by discharging a bank of the capacitor banks 146a-146b. In various embodiments, the pulse shaping network may be a resistance and an inductance in series. Other pulse shaping networks may be implemented to meet the design criteria of a particular application.

Figure 3:
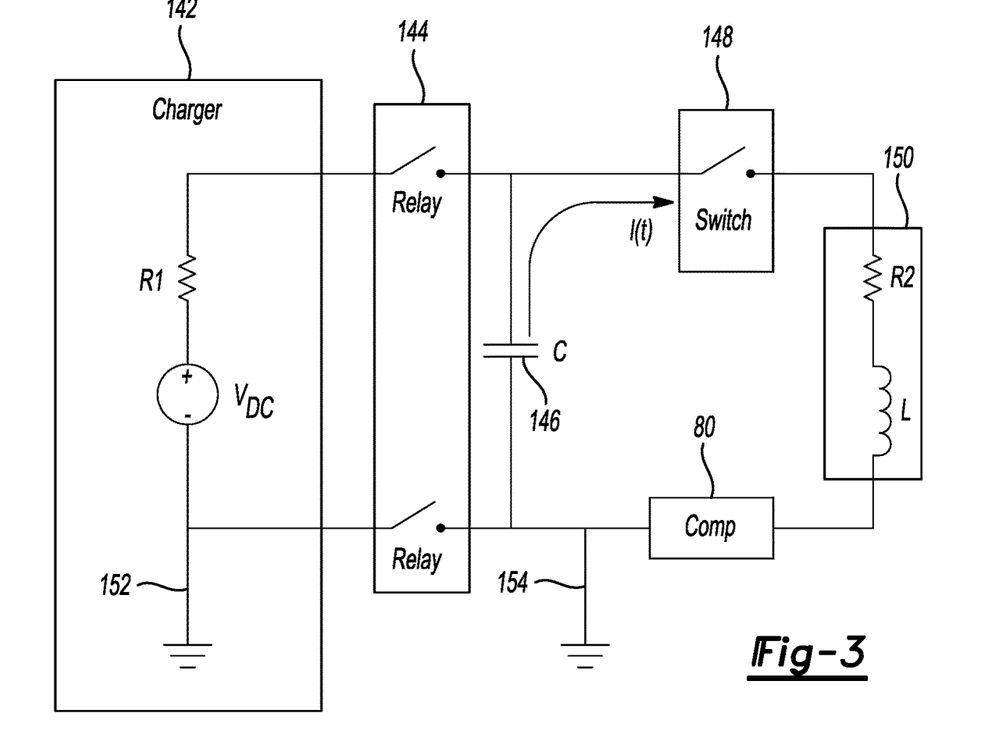
FIG. 3 is a schematic electrical diagram of the pulse generator in accordance with an exemplary embodiment.

Referring to FIG. 3, a schematic electrical diagram of an example implementation of the pulse generator 104x is shown in accordance with an exemplary embodiment. The pulse generator 104x generally comprises the charger 142, the charge relays 144, the capacitor banks 146 (one bank shown), the discharge switch 148, the discharge shaper 150, a facility ground 152, and a lightning ground 154. The component 80 may be electrically connected between the discharge shaper 150 and the capacitor banks 146.

To charge the capacitor bank 146, the charge relays 144 are closed and the discharge switch 148 is open. A direct-current voltage ($V_{DC}$) source in the charger 142 may charge the capacitor bank 146 through a resistance (R1). Once the bank is charged, the charge relays 144 may be opened.

Generation of the current pulse is achieved by closing the discharge switch 148. A current (I(t)) flows from the capacitor banks 146 through the discharge shaper 150 and the component 80. The current I(t) may be approximated as a double exponential function using Kirchhoff's Law per formula 1 as follows:

$$I(t)=(V_{DC}/\alpha)\times[e^{-((t/2L)\times(R2-\alpha))}-e^{-((t/2L)\times(R2+\alpha))}] \qquad (1)$$

where a is defined by formula 2 as follows:

$$\alpha=\sqrt{|R2^2-(4L/C)|} \qquad (2)$$

By varying the inductance value L and the resistance value R2, a shape of the waveform may be stretched out to be broader and flatter, or tightened to create a sharper peak. The specific shape of the waveform generally plays a smaller role in the conditioning of the component 80 than an amount of energy passed through the component 80. The current pulse I(t) may be tuned for the particular job. For example, one or more extra shaping resistors and/or one or more extra inductors may be included in the discharge shaper 150 to achieve different effects on the component 80.

Figure 4:
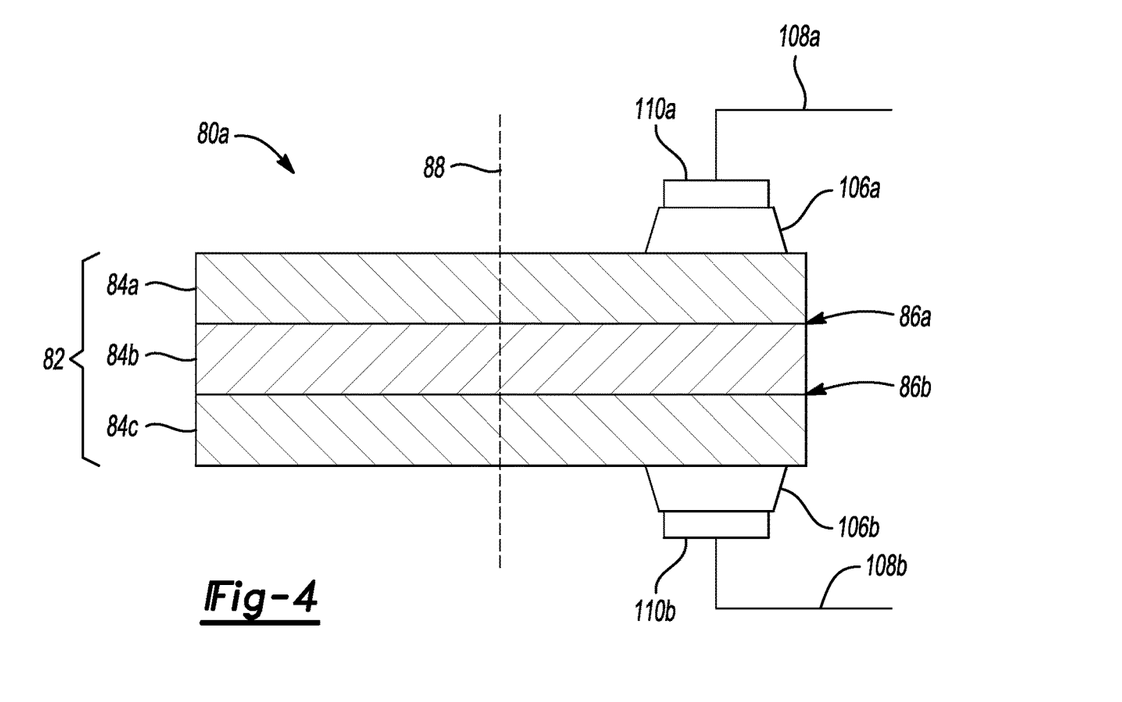
FIG. 4 is a schematic cross-sectional diagram of a component having a first design in accordance with an exemplary embodiment.

Referring to FIG. 4, a schematic cross-sectional diagram of an example implementation of a component 80a having a first design is shown in accordance with an exemplary embodiment. The component 80a may be a variation of the component 80. In various embodiments, the component 80a may be a part of an aircraft. The component 80a generally comprises a panel made of a composite material 82. The composite material 82 includes multiple ply layers 84a-84c joined at seams 86a-86b. A direction that crosses at right angles to the ply layers 84a-84c and the seams 86a-86b may be considered perpendicular 88 to the ply layers 84a-84c and the seams 86a-86b. In the example, multiple (e.g., two) tabs 106a-106b are positioned on the component 80a and aligned perpendicular 88 to the ply layers 84a-84c for the conditioning treatment. The tabs 106a-106b are positioned on opposite sides of the ply layers 84a-84c such that the current passes through the seams 86a-86b.

Placement of the tabs 106a-106n on the component 80a may vary based on a size, a shape, and a location of the component 80a within the aircraft. The tabs 106a-106n are generally located for end-to-end contact. In some embodiments, the tabs 106a-106n may be placed for side-to-side contact at appropriate places. Multiple tabs 106a-106n may be used to inject the current pulses 130. Grounding may be achieved through multiple tabs 106a-106n placed at a variety of locations.

The conditioning may be achieved in many directions (e.g., the x direction, the y direction, and the z direction) through the component 80a. Conditioning perpendicular 88 to the ply layers 84a-84c may be particularly beneficial because the conductivity is the z direction is initially poor due to the seams 86a-86b. The z direction is often an initial direction in which improvement in the aircraft are usually seen, even if the effect is small.

Figures 5, 6, 7, 8:
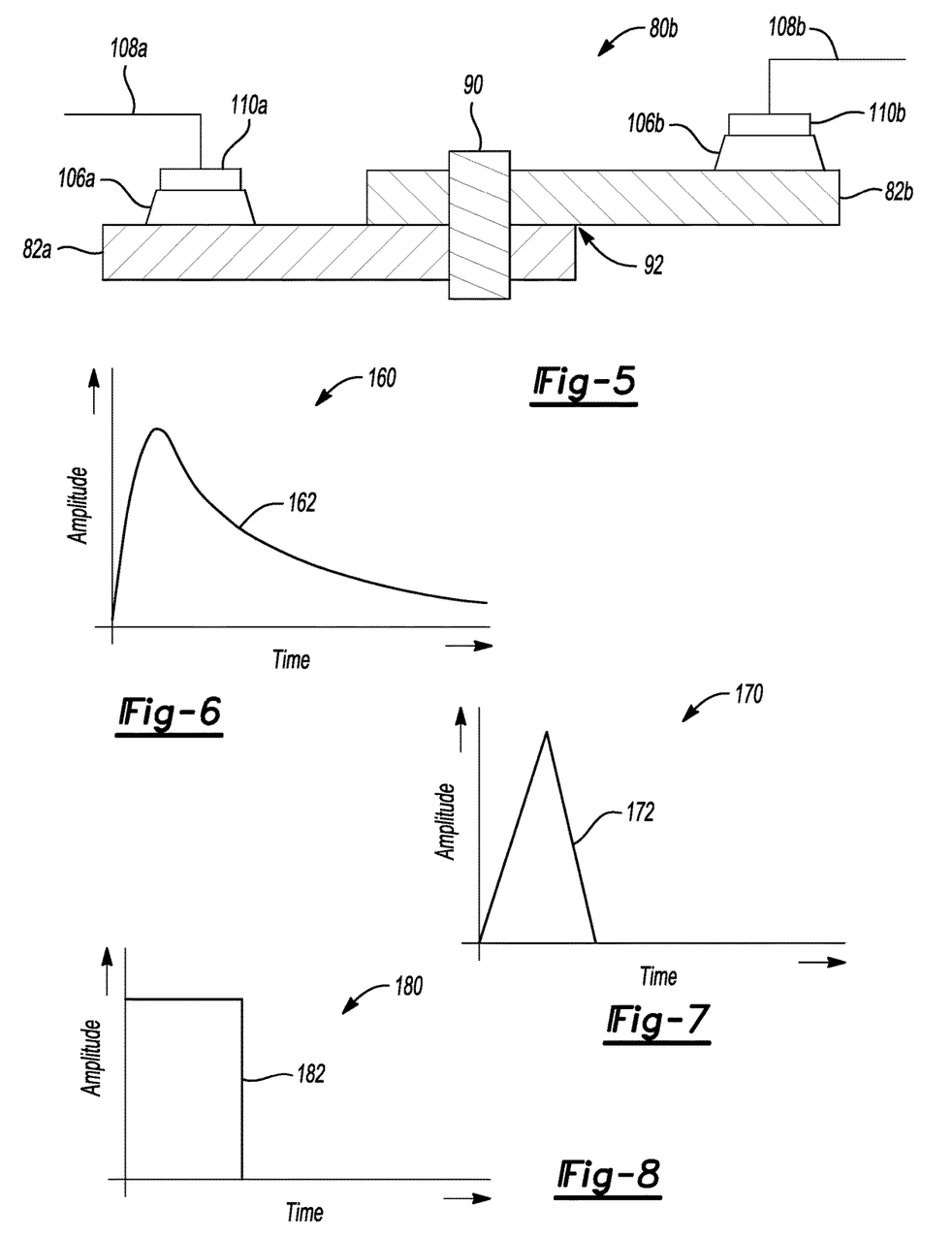
FIG. 5 is a schematic cross-sectional diagram of a component having a second design in accordance with an exemplary embodiment.
FIG. 6 is a graph of a double-exponential pulse in accordance with an exemplary embodiment.
FIG. 7 is a graph of a component-A pulse in accordance with an exemplary embodiment.
FIG. 8 is a graph of a square wave pulse in accordance with an exemplary embodiment.

Referring to FIG. 5, a schematic cross-sectional diagram of an example implementation of a component 80b having a second design is shown in accordance with an exemplary embodiment. The component 80b may be a variation of the components 80 and/or 80a. The component 80b generally comprises two composite materials 82a-82b. The composite materials 82a-82b are joined together by a fastener 90 thereby forming a joint 92. The fastener 90 and the joint 92 may be a source of current-induced sparking when an electrical current from a lightning strike passes between the composite materials 82a and 82b. In various embodiments, the fasteners 90 may be implemented as rivets and/or bolts. In some embodiments, stitching, pinning, braiding, or folding may be used to attach the composite materials 82a-82b. Other types of fasteners 90 may be implemented to meet the design criteria of a particular application.

When initially fabricated, the component 80b may be subject to sparking when the current flow reaches a first threshold. By injecting the current pulses 130 across the joint 92, the minimum current that causes sparking at the joint 92 may be raised to a second threshold. Passing the current pulses 130 across the joint 92 causes sintering of the composite materials 82*a*-82*b* that improves the inter-panel conductivity. Consequently, the component 80*b* is less likely to spark due to a natural lightning strike after the conditioning treatment compared with not the conditioning treatment.

Referring to FIG. 6, a graph 160 of an example double-exponential pulse is shown in accordance with an exemplary embodiment. An x axis of the graph 160 shows time. A y axis of the graph 160 shows a current amplitude of the current pulses 130.

The current pulses 130 are shaped by the discharge shaper 150 prior to passing through the component 80. An initial surge of a natural lightning strike may be imitated by shaping the waveforms of the current pulses 130 into a double-exponential waveform 162. A peak amplitude of the double-exponential waveform 162 may range up to 220,000 amperes. A duration of the pulse may be on the order of 800 milliseconds or less. Other peak currents and/or pulse durations may be implemented to meet the conditioning criteria of a particular component 80.

Referring to FIG. 7, a graph 170 of an example component-A pulse is shown in accordance with an exemplary embodiment. An x axis of the graph 170 shows time. A y axis of the graph 170 shows a current amplitude of the current pulses 130.

An initial surge of a natural lightning strike may be imitated by shaping the waveforms of the current pulses 130 into a component-A waveform 172. The component-A waveform 172 is specified by MIL-STD-1757A, published by the Department of Defense, Washington D.C. The peak amplitude of the component-A waveform 172 may range up to 220,000 amperes. A total duration of the pulse is not to exceed 800 milliseconds. The pulse may be unidirectional or oscillatory. Other peak currents and/or pulse durations may be implemented to meet the conditioning criteria of a particular component 80.

Referring to FIG. 8, a graph 180 of an example square wave pulse is shown in accordance with an exemplary embodiment. An x axis of the graph 180 shows time. A y axis of the graph 180 shows a current amplitude of the current pulses 130.

An initial surge of a natural lightning strike may be imitated by shaping the waveforms of the current pulses 130 into a square wave waveform 182. The peak amplitude of the square wave waveform 182 may range up to 220,000 amperes. The duration of the pulse may be on the order of 800 milliseconds or less. Other peak currents and/or pulse durations may be implemented to meet the conditioning criteria of a particular component 80.

Figure 9:
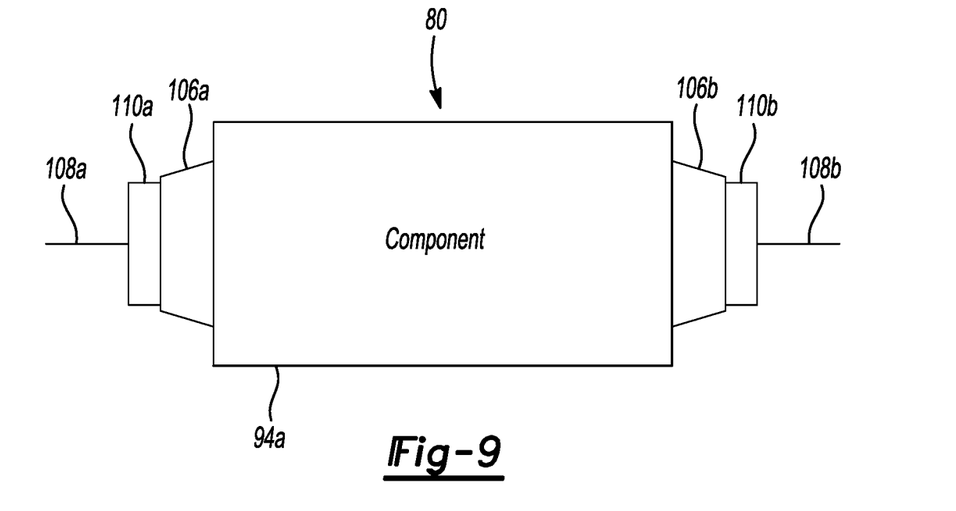
FIG. 9 is a schematic diagram of the component wired for conditioning in accordance with an exemplary embodiment.

Referring to FIG. 9, a schematic diagram of an example implementation of the component 80 wired for conditioning is shown in accordance with an exemplary embodiment. The component 80 may include a single panel 94*a*. The tabs 106*a*-106*b* may be located at opposing ends of the component 80. Therefore, the current pulses 130 may pass through the entire component 80.

Figure 10:
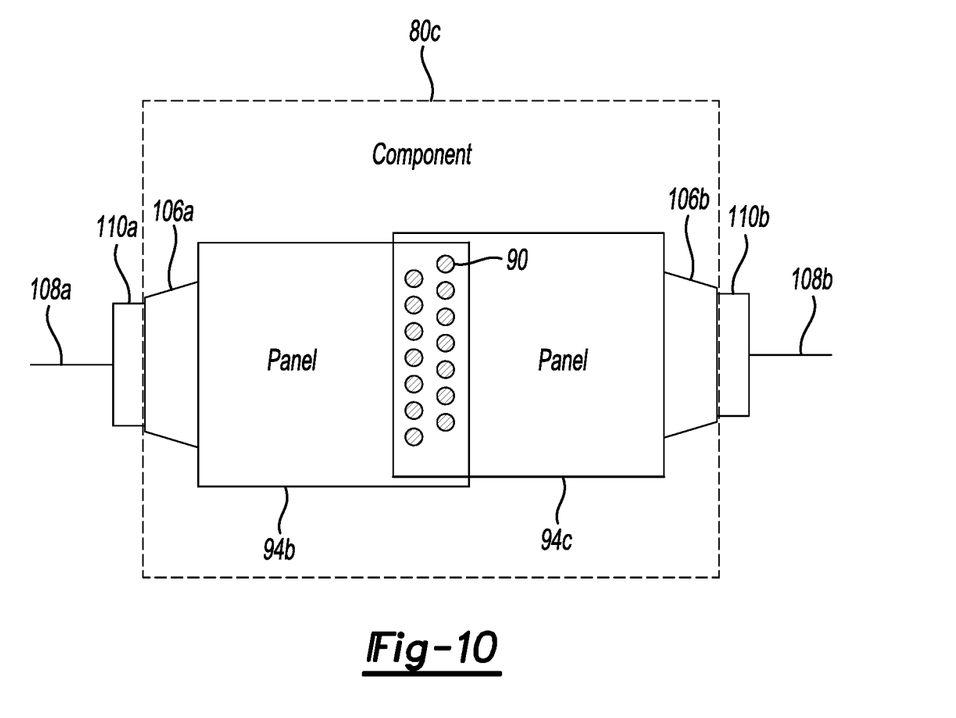
FIG. 10 is a schematic diagram of a component having a third design in accordance with an exemplary embodiment.

Referring to FIG. 10, a schematic diagram of an example implementation of a component 80*c* having a third design is shown in accordance with an exemplary embodiment. The component 80*c* may represent the components 80*a* and/or 80*b*. The component 80*c* may include two overlapping panels 94*b* and 94*c* joined together by one or more of the fasteners 90. The tabs 106*a*-106*b* may be located at opposing ends of the component 80*c*. Therefore, the current pulses 130 may pass through the fasteners 90 and the joint formed by the overlapping panels 94*b* and 94*c*.

Figure 11:
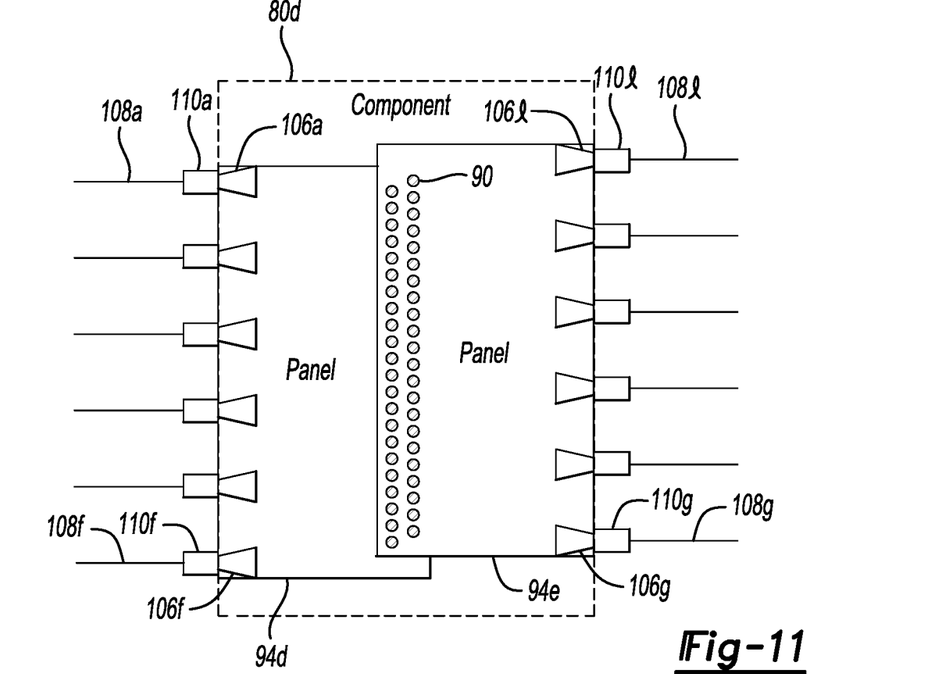
FIG. 11 is a schematic diagram of a component having a fourth design in accordance with an exemplary embodiment.

Referring to FIG. 11, a schematic diagram of an example implementation of a component 80*d* having a fourth design is shown in accordance with an exemplary embodiment. The component 80*d* may represent the components 80*a*, 80*b* and/or 80*c*. The component 80*d* may include two overlapping panels 94*d* and 94*e* joined together by one or more of the fasteners 90. The tabs 106*a*-106*f* may be located at opposing ends of the component 80*c* as the tabs 106*g*-106*l*. In some conditioning modes, the current pulses 130 may be passed between the tabs 106*a*-106*f* and the tabs 106*g* and 106*l* simultaneously. In other conditioning modes, the current pulses 130 may be passed between sets of the tabs 106*a*-106*f* and the tab 106*g*-106*l*, one set at a time. For example, the first current pulse(s) may be between the tabs 106*a* and 106*l*. The second current pulse(s) may be between the tabs 106*b* and 106*k*, and so on.

Figure 12:
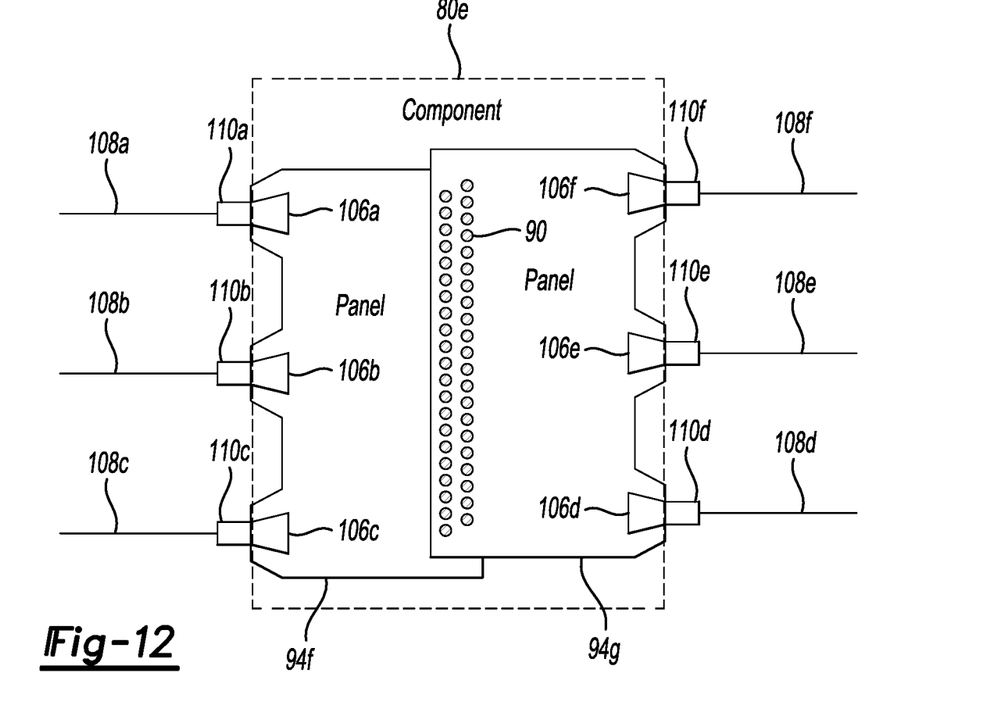
FIG. 12 is a schematic diagram of a component having a fifth design in accordance with an exemplary embodiment.

Referring to FIG. 12, a schematic diagram of an example implementation of a component 80*e* having a fifth design is shown in accordance with an exemplary embodiment. The component 80*e* may represent the components 80*a*, 80*b*, 80*c* and/or 80*d*. The component 80*e* may include two overlapping panels 94*f* and 94*g* joined together by one or more of the fasteners 90. The panels 94*f* and 94*g* may have non-rectangular shapes with protrusions at the edges opposite the overlapping joint. The tabs 106*a*-106*c* may be positioned at the protrusions of the panel 94*f*. The tabs 106*d*-106*f* may be positioned at the protrusions of the panel 94*g*.

Figure 13:
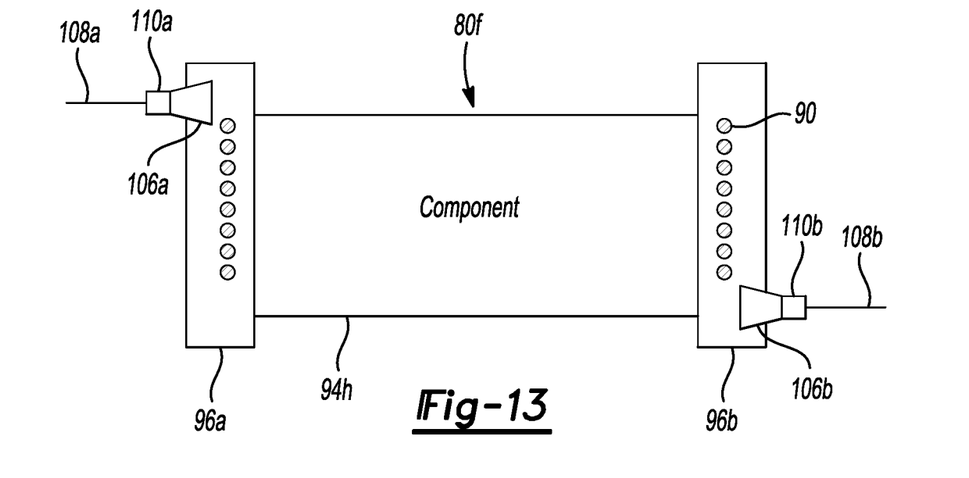
FIG. 13 is a schematic diagram of a component having a sixth design in accordance with an exemplary embodiment.

Referring to FIG. 13, a schematic diagram of an example implementation of a component 80*f* having a sixth design is shown in accordance with an exemplary embodiment. The component 80*f* may include a panel 94*h* with metal material (e.g., bars) 96*a*-96*b* disposed on opposing ends of the panel 94*h*. The metal material 96*a*-96*b* may be attached to the panel 94*h* with multiple fasteners 90. The tab 106*a* may be connected to, or built as part of, the metal material 96*a*. The tab 106*b* may be connected to, or built as part of, the metal material 96*b*. The metal material 96*a*-96*b* may distribute the current pulses 130 across a width of the panel 94*h* such that the conditioning is provided to the entire panel 94*h*.

Figure 14:
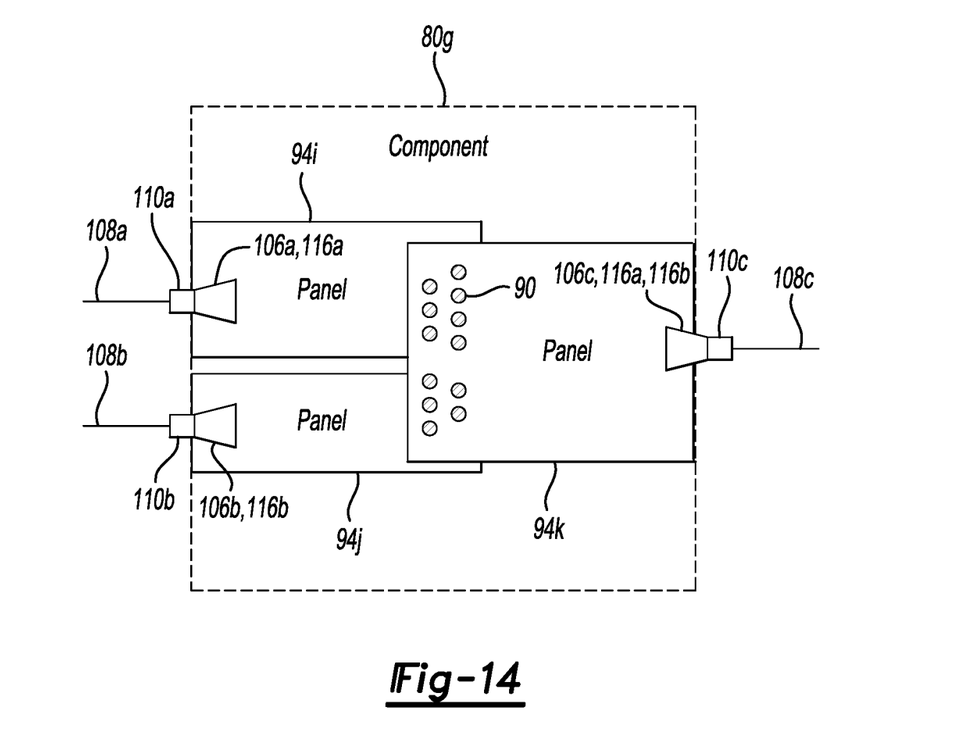
FIG. 14 is a schematic diagram of a component having a seventh design in accordance with an exemplary embodiment.

Referring to FIG. 14, a schematic diagram of an example implementation of a component 80*g* having seventh design is shown in accordance with an exemplary embodiment. The component 80*g* may include three overlapping panels 94*i*, 94*j*, and 94*k* joined together by the fasteners 90. The panels 94*i* and 94*j* may both overlap and connect to the panel 94*k*. The tab 106*a* may be positioned on the panel 94*i*. The tab 106*b* may be positioned on the panel 94*j*. The tab 106*c* may be positioned on the panel 94*k*.

In various conditioning situations, the tabs 106*a*-106*c* may be operated in sets 116*a* and 116*b*. For example, the first set 116*a* (tab 106*a* and tab 106*c*) may be used to pass the current pulses 130 between the panel 94*i* and the panel 94*k* without involving the panel 94*j*. The second set 116*b* (tab 106*b* and tab 106*c*) may be used to pass the current pulses 130 between the panel 94*j* and the panel 94*k* without involving the panel 94*i*. In other conditioning situations, all of the tabs 106*a*-106*c* may be used simultaneously to pass the current pulses 130 through the component 80*g*.

Figure 15:
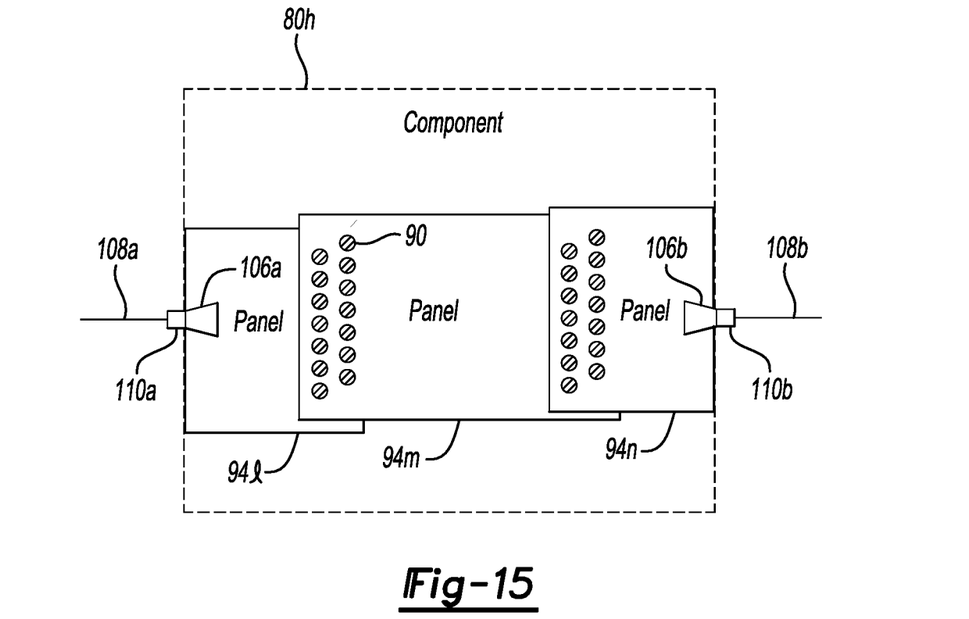
FIG. 15 is a schematic diagram of a component having an eighth design in accordance with an exemplary embodiment.

Referring to FIG. 15, a schematic diagram of an example implementation of a component 80*h* having an eighth design is shown in accordance with an exemplary embodiment. The component 80*h* may include three overlapping panels 94*l*, 94*m*, and 94*n* joined together in series by the fasteners 90. The panel 94*l* may overlap and be attached to the panel 94*m*. The panel 94*m* may overlap and be attached to the panel 94*n*. The tab 106*a* may be positioned on the panel 94*l*. The tab 106*b* may be positioned on the panel 94*n*. The panel 94*m* may lack a direct connection to the tabs 106a-106n. Therefore, the current pulses 130 may be routed through the entire component 80h and through both overlapping regions.

Figure 16:
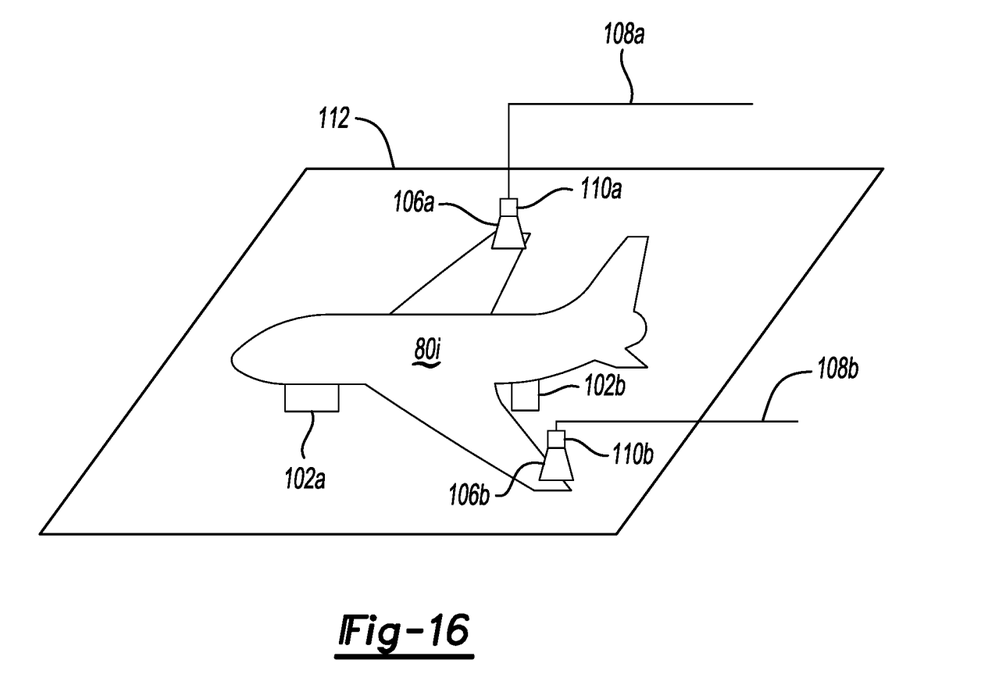
FIG. 16 is a schematic diagram of a component having a ninth design in accordance with an exemplary embodiment.

Referring to FIG. 16, a schematic perspective diagram of an example implementation of a component 80i having a ninth design is shown in accordance with an exemplary embodiment. The component 80i may be implemented as an aircraft. The aircraft component 80i may be positioned inside the chamber 112 resting on multiple supports 102a-102b on a floor of the chamber 112. In the example illustrated, the tabs 106a-106b may be positioned at opposite wingtips for the conditioning treatment. Additional tabs 106a-106n may be positioned at other locations, such as the nose, tail, vertical stabilizer, horizontal stabilizers, fuselage, and the like. Modeling of the component 80i may be performed to determine where to locate the tabs 106a-106n, how may current pulses 130 to be applied, the amplitude of the current pulses 130, and/or timing of the current pulses 130 to condition the component 80i.

Figure 17:
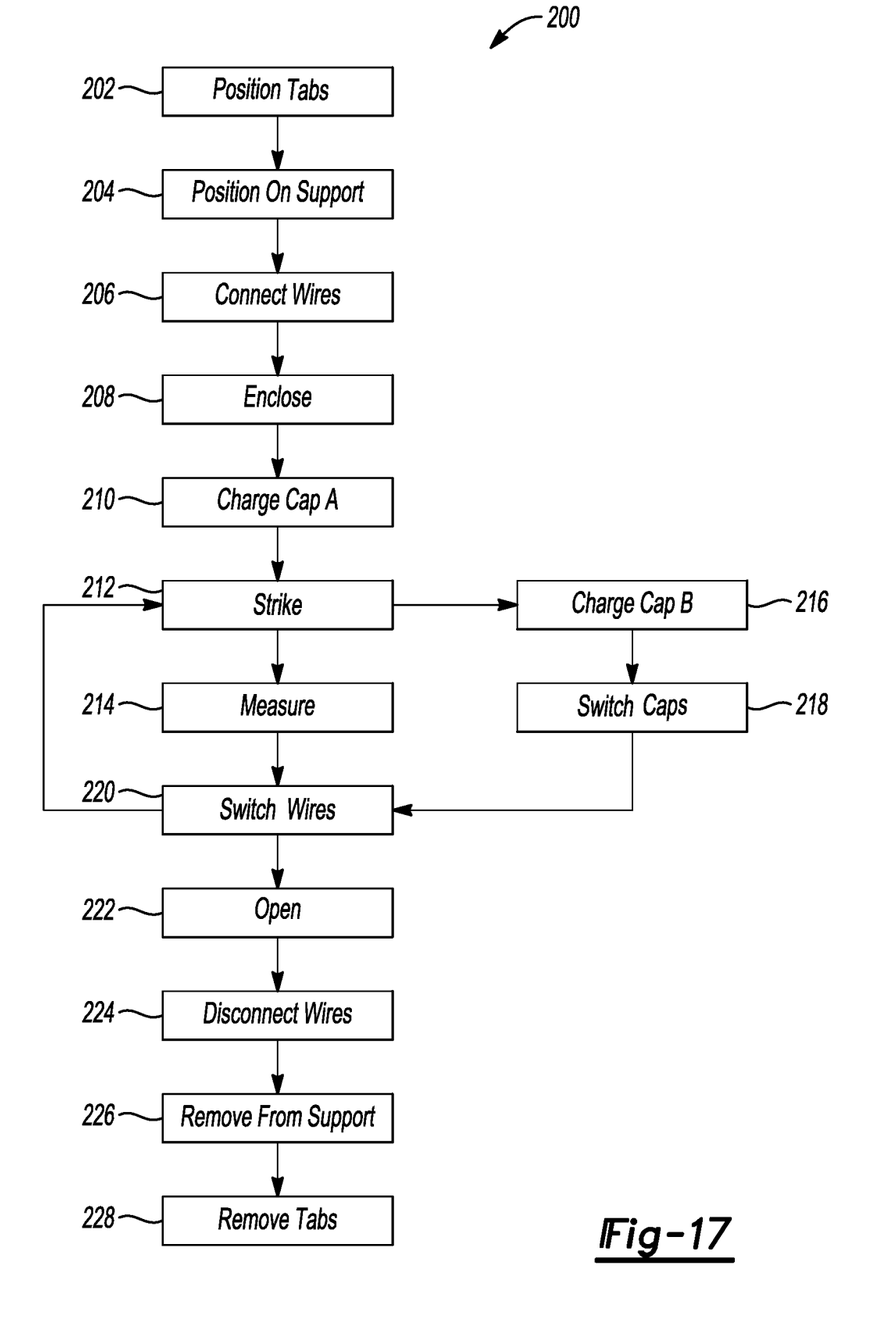
FIG. 17 is a flow diagram of a method for conditioning the component to reduce lightning strike effects in accordance with an exemplary embodiment.

Referring to FIG. 17, a flow diagram of an example implementation of a method 200 for conditioning the component 80 to reduce lightning strike effects is shown in accordance with an exemplary embodiment. The method (or process) 200 may be implemented by the conditioning system 100. The method generally includes a step 202, a step 204, a step 206, a step 208, a step 210, a step 212, a step 214, a step 216, a step 218, a step 220, a step 222, a step 224, a step 226, and a step 228. The sequence of steps is shown as a representative example. Other step orders may be implemented to meet the criteria of a particular application.

In the step 202, the tabs 106a-106n are positioned on the component 80. The tabs 106a-106b are electrically conductive. The tabs 106a-106n prevent the current pulses 130 from damaging the surface of the component 80. The component 80 includes the composite material 82. In the step 204, the component 80 is positioned on the support 102. The support 102 is electrically insulated to help minimize the leakage currents 114 during the conditioning treatment. The support 102 is disposed inside the chamber 112. The wires 108a-108n are connected between an initial set 116a of the tabs 106a-106n and a pulse generator (e.g., 104a) in the step 206. The wires 108a-108n fix the paths of the current pulses 130 to the tabs 106a-106n rather than directly to the components 80, which could be scorched. The pulse generator 104a is configured to generate the plurality of current pulses 130 through the wires 108a-108n. The current pulses 130 imitate a plurality of lightning strikes. In the step 208, doors of the chamber 112 are closed to enclose the component 80 in a controlled environment during the strikes, The chamber 112 being configured to contain leakage currents 114 from the current pulses 130, and contain the high voltages and high currents (e.g., greater than 1,000 amperes) present during the conditioning treatment.

In the step 210 a first capacitor bank A of the capacitor banks 146a-146b may be charged with the charger 142 of the pulse generator 104a. In the step 212, the component 80 may be struck with the current pulses 130 from the pulse generator 104a. The current pulses 130 generally imitate lightning strikes that condition the component 80 to better handle natural lighting strikes. After each current pulse 130 and/or after a sequence of current pulses 130 have conditioned the component 80, the diagnostic and control circuit 140 of the pulse generator 104a may optionally measure and report the conductance of the component 80 in the step 214 to the control circuit 120 to enable the user 70 to evaluate the conditioning treatment.

While the component 80 is being conditioned by the controlled strike(s), a second capacitor bank B of the capacitor banks 146a-146b is charged by the charger 142 in the step 216. The charging is a trickle charging that presents a manageable power drain on the power gird that services the conditioning system 100. After the first capacitor bank A has been discharged and/or the second capacitor bank B has finished charging, the capacitor bank B may be switched in place of the capacitor bank A in the step 218. The switching may be performed electro-mechanically using relays and/or switches. In some embodiments, the first capacitor bank A may be part of a first pulse generator (e.g., 104a) and the second capacitor bank B may be part of another pulse generator (e.g., 104b). In such embodiments, the switching may replace the first pulse generator 104a with the second pulse generator 104b. Switching the capacitor bank A and the capacitor bank B reduces a time delay between when the active capacitor bank is discharged and a next current pulse 130 can be generated.

In the step 220, the active wires 108a-108n may be optionally disconnected from the initial set 116a of the tabs 106a-106n and subsequently reconnected to one or more different sets 116b of the tabs 106a-106n between the current pulses 130. The movement of the wires 108a-108n allows for complex components 80 to be conditioned along several different lines. In various embodiments, a logical disconnecting and reconnecting may be performed electro-mechanically using relays and/or switches to route the current pulses 130 on different wires 108a-108n. In other embodiments, a physical disconnecting and reconnecting may be performed mechanically where the connectors 110a-110n are removed from the first set 116a of the tabs 106a-106n and attached to the second set 116b of the tabs 106a-106n.

In some passes through the step 220, the wires 108a-108n may be left attached to the initial set 116a of tabs 106a-106n. The method 200 may subsequently return to the step 212 to strike the component 80 again with the newly charged capacitor bank A or B. In other passes through the step 220, the active wires 108a-108n may switch the current pulses 130 to the one or more different sets 116b of the tabs 106a-106n. The method 200 may subsequently return to the step 212 to strike the component 80 again. A loop around the steps 212, 214 and 220 may be repeated as appropriate to condition the component 80. The path from the step 212 through the steps 216, 218, and 220 may be repeated, as appropriate, as the capacitor banks 146a-146b are charged and discharged. Once a last imitation lightning strike has been applied to the component 80 and the conductance measurement has been made, electrical power may be switched away from the wires 108a-108n in the last pass through the step 220.

After the conditioning treatment of the component 80 has completed, the doors of the chamber 112 may be opened in the step 222. In the step 224, the wires 108a-108n may be disconnected from the tabs 106a-106n. The conditioned component 80 is removed from the support 102 in the step 226. In situations where the tabs 106a-106n were added to the component 80 specifically for the conditioning treatment, the tabs 106a-106n may be removed from the component 80 in the step 228. In situations where the tabs 106a-106n are integral parts of the component 80, the tabs 106a-106n may remain with the component 80. In some conditions, the tabs 106a-106n may be consumed (e.g., vaporized) by the conditioning treatment and so a minor cleanup of the surface of the component 80 where the tabs 106a-106n were located may be performed in the step 228.

Embodiments of the disclosure generally provide a method and/or a conditioning system to condition the aircraft and/or aircraft components during the manufacturing process. The components may initially be fabricated, in some situations, with the tabs 106a-106n built in to support current injection. Otherwise, the tabs 106a-106n may be mounted on the components 80 after fabrication. The component 80 may be placed on the support 102 in a suitable environment and the wires 108a-108n connected between the tabs 106a-106n and one or more pulse generators 104a-104n. One or more capacitor banks 146a-146b may be charged to provide electrical power to create the current pulses 130. The current pulses 130 may be passed through the component 80 to condition the component 80 for future natural lightning strikes. After the conditioning treatment has finished, the tabs 106a-106n previously added to the component 80 may be removed from the component 80.

The component 80 may comprise one or more composite materials, one or more metals, and/or combinations of composite materials and metals. In various designs, the conditioning at the joints between metal materials, between composite materials, and/or between a metal material and a composite material may raise a minimum threshold current that induces sparking at the joints.

The current pulses 130 generally provide conditioning the aircraft at a worst-case current (e.g., 200,000 amperes), whereas a natural lightning strike is of lower current (30,000 amperes), and may be at a random location on the aircraft. Modeling and simulations may be used to decide which subparts of the aircraft and where to strike the aircraft that may be the most economical.

Improvements in material conductivity due to the conditioning affect the thickness of the aircraft skin in the fuselage. Improvements in conduction between fasteners and holes due to the conditioning also affect the energy drop in the wings, and in turn affect the weight of the lightning protection systems suitable to protect the fuel tank from sparks. Therefore, confidence of the flying public increases where the aircraft is known to react well under lighting threats, and in particular, where proven in aircraft already flying the public.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method for conditioning to reduce lightning strike effects, the method comprising:
    positioning a plurality of tabs on a component, wherein the plurality of tabs are electrically conductive, the component includes at least one of a composite material and a metal material, and the metal material includes at least one joint;
    positioning the component on a support that is electrically insulated;
    connecting a plurality of wires between an initial set of the plurality of tabs and a pulse generator, wherein the pulse generator is configured to generate a plurality of current pulses through the plurality of wires, and the plurality of current pulses imitate a plurality of lightning strikes;
    striking the component with the plurality of current pulses from the pulse generator; and
    reconnecting the plurality of wires to one or more different sets of the plurality of tabs between the plurality of current pulses.

2. The method according to claim 1, wherein the component is an aircraft.

3. The method according to claim 1, wherein the component is part of an aircraft.

4. The method according to claim 1, further comprising:
    enclosing the component inside a chamber during the striking, wherein the chamber is configured to contain leakage currents from the plurality of current pulses.

5. The method according to claim 1, wherein the composite material has a plurality of ply layers, and at least two of the plurality of tabs are positioned on the component perpendicular to the plurality of ply layers and on opposite sides of the plurality of ply layers.

6. The method according to claim 1, wherein the component includes the at least one joint, and the plurality of current pulses exceed a minimum current that causes sparking at the at least one joint.

7. The method according to claim 1, wherein at least one of the plurality of current pulses is in a range of approximately 180,000 amperes to approximately 220,000 amperes.

8. The method according to claim 1, wherein each of the plurality of current pulses has a double-exponential waveform.

9. The method according to claim 1, wherein each of the plurality of current pulses has a component-A waveform in accordance with MIL-STD-1757A or a square wave waveform.

10. The method according to claim 1, further comprising:
    charging a first capacitor bank while a second capacitor bank provides electrical power to the pulse generator; and
    switching the second capacitor bank with the first capacitor bank in response to the second capacitor bank becoming discharged.

11. A conditioning system comprising:
    a support that is electrically insulated and configured to hold a component, wherein the component includes at least one of a composite material and a metal material, and the metal material includes at least one joint;
    a pulse generator configured to generate a plurality of current pulses, wherein the plurality of current pulses imitate a plurality of lightning strikes;
    a plurality of tabs that are electrically conductive and positioned on the component; and
    a plurality of wires connected to the pulse generator and removably connectable to an initial set of the plurality of tabs, wherein the conditioning system is configured to strike the component with the plurality of current pulses from the pulse generator, and the plurality of wires are moveable to one or more different sets of the plurality of tabs between the plurality of current pulses.

12. The conditioning system according to claim 11, wherein the component is an aircraft.

13. The conditioning system according to claim 11, wherein the component is a part of an aircraft.

14. The conditioning system according to claim 11, further comprising a chamber configured to enclose the component during the strikes, wherein the chamber is configured to contain leakage currents from the plurality of current pulses.

15. The conditioning system according to claim 11, wherein the composite material has a plurality of ply layers, and at least two of the plurality of tabs are positioned on the component perpendicular to the plurality of ply layers and on opposite sides of the plurality of ply layers.

16. The conditioning system according to claim 11, wherein the component includes the at least one joint, and the plurality of current pulses exceed a minimum current that causes sparking at the at least one joint.

17. The conditioning system according to claim 11, wherein at least one of the plurality of current pulses is in a range of approximately 180,000 amperes to approximately 220,000 amperes.

18. The conditioning system according to claim 11, wherein each of the plurality of current pulses has a double-exponential waveform.

19. The conditioning system according to claim 11, wherein each of the plurality of current pulses has a component-A waveform in accordance with MIL-STD-1757A or a square wave waveform.

20. A component of an aircraft conditioned by the method of claim 1.

\* \* \* \* \*